United States Patent

[11] 3,602,816

| | | |
|---|---|---|
| [72] | Inventor | Carl Frederick Van Bennekom<br>Lynnfield, Mass. |
| [21] | Appl. No. | 824,245 |
| [22] | Filed | May 13, 1969 |
| [45] | Patented | Aug. 31, 1971 |
| [73] | Assignee | General Electric Company |

[54] TAUT BAND INSTRUMENT FRAME ASSEMBLY
3 Claims, 9 Drawing Figs.

[52] U.S. Cl. ............................................. 324/151, 324/156
[51] Int. Cl. ............................................. G01r 1/04
[50] Field of Search ................................. 324/151, 151 A, 154, 156

[56] References Cited
UNITED STATES PATENTS
3,141,133 7/1964 Wanlstedt ................. 324/151 (A)
FOREIGN PATENTS
429,019 5/1935 Great Britain ............. 324/151

Primary Examiner—Alfred E. Smith
Attorneys—Frank L. Neuhauser, William S. Wolfe, Gerald R. Woods, Oscar B. Waddell and Joseph B. Forman ABSTRACT: A stable frame assembly for supporting and locating the suspension system, armature, magnet and flux cup in a taut band electrical indicating instrument. A rigid, glass reinforced thermoplastic frame member fits within, engages, and is restrained by an integral metallic flux cup and shield to provide the stable frame assembly.

PATENTED AUG 31 1971 3,602,816

INVENTOR
CARL F. VAN BENNEKOM

BY George A. Herbster

ATTORNEY

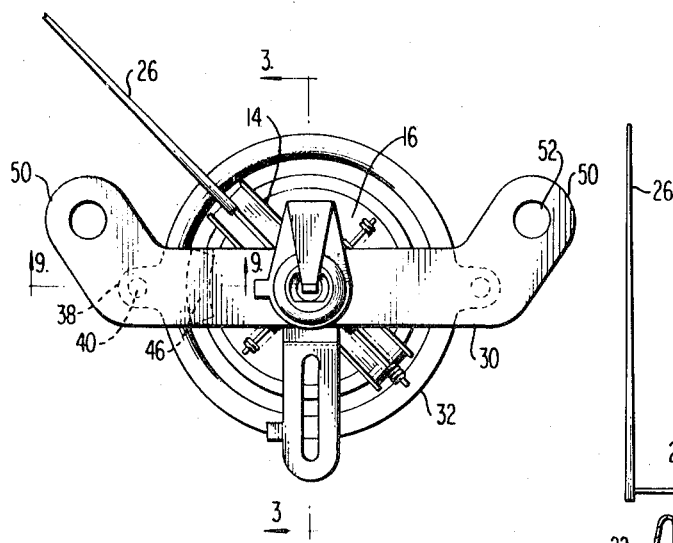
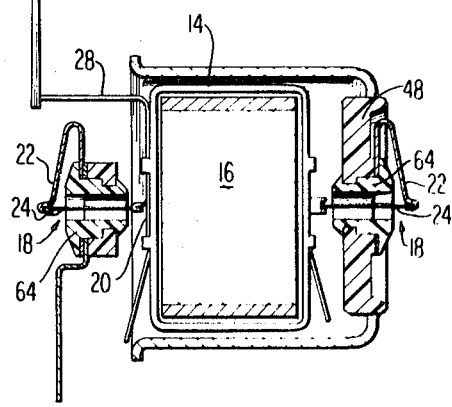
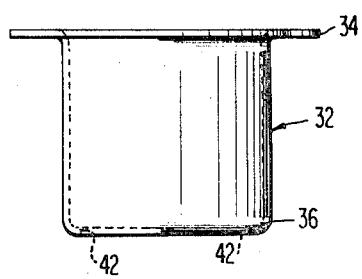
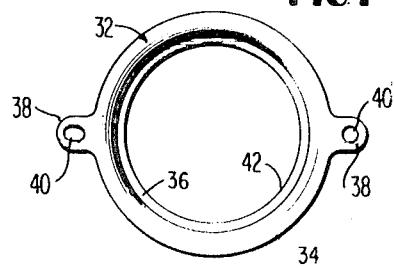
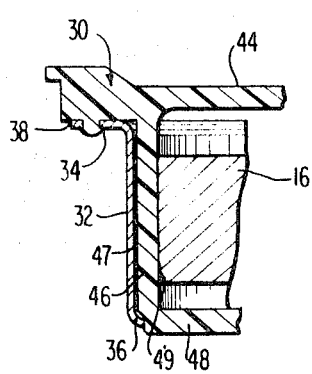
INVENTOR
CARL F. VAN BENNEKOM
BY George A. Herbster
ATTORNEY

3,602,816

TAUT BAND INSTRUMENT FRAME ASSEMBLY

BACKGROUND OF THE INVENTION

This invention relates generally to electrical measuring instruments of the D'Arsonval type and more particularly, to a frame assembly for supporting a taut band moving system in such instruments.

Instruments of the D'Arsonval type include an armature assembly having a moving coil which is suspended for rotation through a field produced by a permanent magnet assembly. When the armature assembly is energized by means of a current flowing through the moving coil, a torque results which moves the coil relative to the permanent magnet assembly. An instrument pointer, connected to the movable coil, yields a readout with respect to a faceplate or scale mounted behind the pointer.

Various suspension systems exist and can be categorized generally as pivot-and-jewel systems or taut-band suspension systems, Notwithstanding the suspension system category, some structural members are needed for supporting the instrument assembly within an instrument casing. One structural member, the frame, supports and locates the moving system which incorporates the suspension system, the armature, the magnet and the flux ring of the instrument. Most instrument frames have been constructed of metal because the frame must exhibit certain properties including strength, stiffness, and longtime stability in an operating environment. Metal frames, however, do not possess at least two other highly desirable properties of electrical insulation and low cost.

SUMMARY

In accordance with one aspect of this invention, the frame assembly comprises an insulating frame which fits within and engages the top and bottom of an integral metallic flux cup and shield. The interengagement between the flux cup and shield and the frame provides the necessary stability to accurately locate a taut band suspension system.

This invention is pointed out with particularity in the appended claims. The above and further objects and advantages of this invention may be more fully appreciated by referring to the following description taken in conjunction with the accompanying drawings.

BRIEF DESCRIPTION OF THE DRAWINGS

FIG. 2 is a top plan view of an instrument assembly constructed in accordance with this invention;

FIG. 3 is a sectional view taken along line 3—3 of FIG. 2;

FIG. 7 is a top plan view of a combined flux cup and shield constructed in accordance with this invention;

FIG. 8 is a front view of the combined flux cup and shield shown in FIG. 7; and

FIG. 9 is a sectional view, taken along line 9—9 of FIG. 2.

DETAILED DESCRIPTION OF AN ILLUSTRATIVE EMBODIMENT

Figure 1:
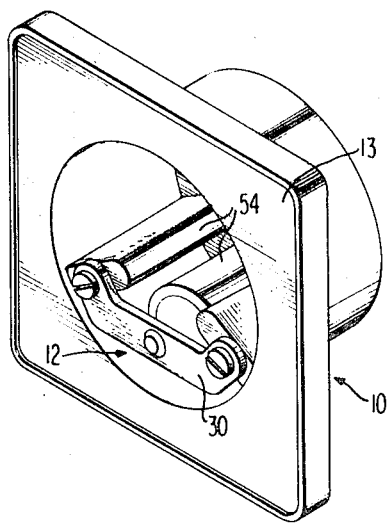
FIG. 1 is a perspective view, with portions removed, of an instrument incorporating a frame assembly constructed in accordance with this invention.

Referring to the FIGURES wherein like numerals represent like parts throughout, an electrical measuring instrument constructed in accordance with this invention and generally designated by the numeral 10 is shown in FIG. 1. The face plate or scale of the electrical measuring instrument 10 has been removed in order to more clearly show the relationship between the frame assembly, generally designated by numeral 12, and an instrument casing 13.

The elements of the instrument 10 are described with reference to FIGS. 2 and 3 to enable one to more readily understand and appreciate the function of the frame assembly 12. As shown in those FIGURES, a movable coil 14 is suspended for rotation about a permanent magnet 16 by means of a taut band suspension system, generally designated 18. The taut band suspension system 18 includes an inner band anchor 20, an outer band anchor 22, and a taut band element 24 connected to the inner band anchor 20 and the outer band anchor 22. The inner band anchor 20 is rigidly connected to the movable coil 14. An instrument pointer 26 is attached to an arm 28 which extends from the inner band anchor 20 and which is formed integrally therewith. A similar arrangement at the opposite end of the movable coil 14 completes the suspension system.

In operation, a current applied to the movable coil 14 through the taut band suspension 18 causes rotation of the movable coil 14 with respect to the permanent magnet 16. As a result, the instrument pointer 26, which is rigidly affixed to the movable coil 14, also rotates to provide a readout.

In an electrical indicating instrument such as the one described above, some means must be provided to support and locate the moving coil 14, the magnet 16, the suspension system 18, and other components. In accordance with this invention, a frame assembly is comprised of a frame member 30 and a combined flux cup and magnetic shield 32. The frame member 30 is the principal structural member of the instrument, while the flux cup and shield 32 provides a number of functions. In addition to affording a return path for the flux emanating from the magnet and also shielding the field of the magnet from distortion caused by external magnetic fields, the flux cup and shield 32 also locates and sustains those portions of the frame member 30 which support the suspension system of the instrument.

The combined flux cup and shield 32 is essentially a cup drawn from inexpensive steel and shaped as shown in FIGS. 7 and 8. The cup is open at both ends and includes an integral, outwardly turned flange 34 at one end and an integral, inwardly turned flange 36 formed at the opposite end. The outwardly turned flange 34 includes a pair of ears 38 having openings 40 located therein as shown in FIG. 7 for receiving one portion of the frame member 30, while the inwardly turned flange 36 yields a circular opening 42 for receiving a second portion of the frame member 30 described hereinafter.

Figure 4:
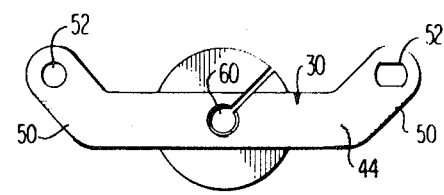
FIG. 4 is a top plan view of a frame constructed in accordance with this invention.
Figure 5:
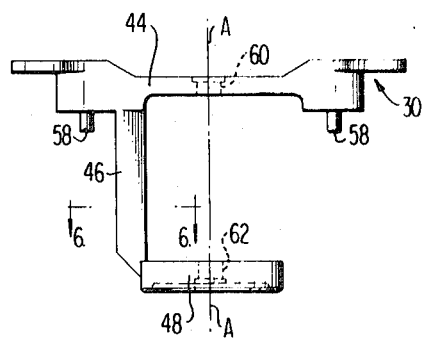
FIG. 5 is a front view of the frame in FIG. 4.
Figure 6:
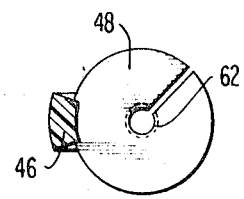
FIG. 6 is a sectional view taken along lines 6—6 of FIG. 5.

The frame member 30 is formed integrally of any suitable insulating material which is relatively stiff and moldable and which provides the necessary electrical insulation properties. The specific frame member 30, shown in FIGS. 4 through 6, is formed of a glass reinforced thermoplastic. The frame member 30 includes a crossbar portion 44, an axially extending arm 46, and a disc portion 48. The crossbar portion 44 is generally rectangularly shaped and includes at each end thereof an ear 50, as generally shown in FIG. 4. Each of the ears 50 includes a circular opening 52 designed to coincide with similar openings (not shown) located in a pair of rigid supports 54 formed integrally with the instrument casing 13 shown in FIG. 1. The frame member 30 can thus be rigidly attached to the instrument casing 13 by screws or other suitable connecting means as shown in FIG. 1.

The rectangular portion of the crossbar 44 includes a pair of protrusions 58 extending from the bottom side thereof as shown in FIG. 5. The protrusions 58 fit within the openings 40 of the combined flux cup and shield 32. The rectangular portion of the crossbar 34 also includes a circular opening 60 located near its midpoint which permits the taut band 24 to pass therethrough.

The axial arm 46 of the frame member 30 is generally arcuate in cross section, as shown in FIG. 6, with an outer surface 17 having a radius of curvature which corresponds to the inner diameter of the flux cup and shield 32. An inner surface 49 corresponds to the outer surface of the permanent magnet 16, as shown in FIG. 9. The permanent magnet 16 has been attached to the axial arm 46 by any suitable method such as cementing by epoxying to be supported and located thereby.

The disc portion 48 of the frame member 30 extends from the bottom end of the axial arm 46, as shown in FIG. 5, and includes a circular opening 62 located at the center thereof directly opposite the opening 60 for receiving the other taut band 24. The disc portion 48 is designed to engage the flux cup and shield 32 at the opening 42 when the protrusions 58 of the frame member 30 register with the openings 40.

Axis A—A of the frame member 30 is the center of rotation of the instrument moving system and suspension system 18. Both the radial and axial stability of this axis are critically important to the correct operation of the instrument assembly. With taut band instruments, a plastic frame would have sufficient axial stability because the outer terminations of both taut bands are connected to outer band anchors which are spring members. These members are substantially deflected in order to put the bands in tension. Hence, a small change in the axial length of the frame merely adds to, or substracts from, the total deflection already in the system and, in most cases, is insignificant.

The need for radial stability is critical, however. Since the clearance between the movable coil 14, the stationary permanent magnet 16 and the flux cup and shield 32 is small, a small change in radial position of the frame 30 with respect to the permanent magnet 16 can cause distortion in the uniformity of the flux path which thereby causes error. Ultimately, the moving assembly could bind. An insulating frame alone would not provide the needed radial stiffness or stability to yield needed long time reliability for electrical measuring instruments. It has been found, however, that positioning the frame member 30 within the flux cup and shield 32 provides the needed radial stability. The protrusions 58 extending from the frame member 30 are seated in the pair of openings 40 located in the outwardly turned flange 34 of the flux cup and shield 32. Once within the openings 40, the protrusions 58 are headed over thereby securing the frame member 30 and the flux cup and shield 32. At the same time as the protrusions 49 enter into the openings 44, the disc portion 48 of the frame member 30 enters into the circular opening 42 formed by the inwardly turned flange 36 at the bottom of the flux cup and shield 32. By this arrangement, the plastic frame 30 is substantially as strong, stiff and stable in the radial direction as if it were made entirely of metal.

As shown in FIG. 3, the outer band anchors 22 of the taut band suspension system 18 are connected to the crossbar portion 44 and the disc portion 48 of the frame member 30, respectively, by means of a pair of snap-in bushings 64 formed of a thermoplastic which possesses electrical insulation properties similar to those of the frame member 30. The movable coil 14 is thus connected to the frame member 30 for rotation about the magnet 16. Further, the frame member 30, being formed of an insulating material, isolates the outer band anchors electrically so that the only current path therebetween is through the taut band suspension and the movable coil 14. Therefore, additional insulating elements required when metallic frame members are used are eliminated.

It will be readily seen from the above description that a simple and low-cost frame assembly which yields all the necessary attributes of a metal frame assembly and the desired electrical insulation properties not readily obtainable solely with a metal frame assembly has been provided. It will also be readily seen that the frame member may be formed in one piece by a simple molding process which eliminates the high cost of machining a metal member. The resulting frame assembly provides reliable operation but decreases the overall cost of the electrical measuring instrument.

While a preferred embodiment of a frame assembly constructed in accordance with this invention has been described, it will be obvious to those skilled in the art that there are certain alterations and modifications in specific details of a frame assembly and selection of materials which may be made without departing from the spirit and scope of this invention. Therefore, it is intended that the appended claims cover all such modifications and alterations as fall within the true spirit and scope of this invention.

What is claimed as new and desired to be secured by Letters Patent of the United States is:

1. A frame assembly for supporting and locating the suspension system, armature, and magnet of an electrical measuring instrument which comprises:
   a. a combination flux cup and shield which consists of a hollow, cylindrical, metallic cup open at each end including an outwardly extending flange at the top thereof, and an inwardly extending flange at the bottom thereof which forms a circular opening, said outwardly extending flange having a plurality of openings located therein; and
   b. a frame member formed of glass reinforced thermoplastic which includes a crossbar portion, a disc portion, and an axial arm connecting said crossbar portion and said disc portion, said crossbar portion including a plurality of protrusions extending from the bottom thereof and received within said openings in said outwardly extending flange of said combination flux cup and shield, said disc portion fitting within said circular opening formed by said inwardly turned flange, and said axial arm including an inner and outer side, said inner side supporting the magnet, and said outer side fitting within said flux cup and shield and extending along the axial length thereof adjacent the inner side thereof.

2. A frame assembly for supporting and locating a taut band suspension system, an armature and a magnet for an electrical measuring instrument comprising:
   a. an integral metallic flux cup and shield including an outwardly extending flange at the top thereof, said flange having a plurality of openings; and
   b. an integral insulating frame member including a crossbar portion having a plurality of protrusions aligned with the openings in said outwardly extending flange, a second portion, and an axial arm connecting said crossbar portion to said second portion, said axial arm having one side contiguous with the inner surface of said flux cup and shield.

3. A frame assembly as recited in claim 4 wherein said flux cup and shield further includes an inwardly extending flange at the bottom thereof engaging the edge of said second portion of said frame member.